United States Patent
Frigo

(10) Patent No.: US 9,442,471 B2
(45) Date of Patent: Sep. 13, 2016

(54) PROCEDURE FOR CONTROLLING THE SHAPE OF A COMPLEX METAL PROFILE OBTAINED BY A SERIES OF SUCCESSIVE BENDINGS OF A SHEET METAL ON A PANEL BENDER

(75) Inventor: Andrea Frigo, Rovereto (IT)

(73) Assignee: FINN-POWER ITALIA S.R.L., Cologna (IT)

( * ) Notice: Subject to any disclaimer, the term of this patent is extended or adjusted under 35 U.S.C. 154(b) by 356 days.

(21) Appl. No.: 14/003,263

(22) PCT Filed: Mar. 2, 2012

(86) PCT No.: PCT/IB2012/051009
§ 371 (c)(1),
(2), (4) Date: Sep. 5, 2013

(87) PCT Pub. No.: WO2012/120430
PCT Pub. Date: Sep. 13, 2012

(65) Prior Publication Data
US 2013/0345850 A1     Dec. 26, 2013

(30) Foreign Application Priority Data
Mar. 7, 2011 (IT) .............................. VR2011A0046

(51) Int. Cl.
*G06F 19/00* (2011.01)
*G05B 15/02* (2006.01)
(Continued)

(52) U.S. Cl.
CPC ............... *G05B 15/02* (2013.01); *B21D 5/004* (2013.01); *B21D 5/006* (2013.01); *B21D 5/045* (2013.01)

(58) Field of Classification Search
CPC ...... G05B 15/02; B21D 5/006; B21D 5/045; B21D 5/004

USPC .................................. 700/145, 117; 72/17.3
See application file for complete search history.

(56) References Cited

U.S. PATENT DOCUMENTS 5,461,893 A  * 10/1995  Tyler ........................ B21D 5/04
                                                                    72/10.1
6,094,960 A  *  8/2000  Kane ...................... B21D 5/042
                                                                    72/319
(Continued)

FOREIGN PATENT DOCUMENTS

DE        4312565 A1   10/1994
EP        1402967 A1    3/2004
(Continued)

OTHER PUBLICATIONS

International Search Authority, Search Report for International Application PCT/IB2012/051008, Apr. 26, 2012, (EPO), 2 pages, The Hague, Netherlands.

*Primary Examiner* — Mohammad Ali
*Assistant Examiner* — Ziaul Karim
(74) *Attorney, Agent, or Firm* — Ference & Associates LLC

(57) ABSTRACT

Described is a procedure for controlling the shape of a complex metal profile obtained by a successive series of a plurality of bends of a metal sheet on a panel bender machine equipped with a data processing and functions control unit for the machine comprising the entering in the processing unit of data relative to a drawing of the complex profile with physical coordinates, as well as data relative to the thickness of the metal sheet and the distance from the axis of the panel bender machine of the metal sheet-profile edge, and conversion of the drawing supplied with physical coordinates into a digital image with imaging coordinates. The nominal profile processed as above is shown on a suitable display superimposed on the image of the complex profile of the metal sheet acquired by a suitably positioned TV camera. A visual control the correspondence between the two superimposed profiles is then performed on the display. From this comparison it is possible to make corrections to the bending parameters of the panel bender machine.

1 Claim, 2 Drawing Sheets

(51) Int. Cl.
  *B21D 5/00*  (2006.01)
  *B21D 5/04*  (2006.01)

(56) References Cited

U.S. PATENT DOCUMENTS

| | | | | |
|---|---|---|---|---|
| 6,217,165 B1 * | 4/2001 | Silverbrook | ............... | B41J 2/14 347/86 |
| 7,055,355 B2 * | 6/2006 | Codatto | ................. | B21D 5/045 72/307 |
| 8,079,244 B2 * | 12/2011 | Spairani | ................. | B21D 7/022 72/307 |
| 2003/0015011 A1 * | 1/2003 | Koyama | .................. | B21D 5/02 72/31.1 |
| 2004/0103706 A1 * | 6/2004 | Codatto | ................. | B21D 5/045 72/31.11 |
| 2006/0041448 A1 * | 2/2006 | Patterson | ............. | G06Q 10/101 705/301 |

FOREIGN PATENT DOCUMENTS

| | | |
|---|---|---|
| EP | 1410855 A1 | 4/2004 |
| JP | 2280920 A1 | 11/1990 |
| JP | 4009216 A1 | 1/1992 |

\* cited by examiner

PROCEDURE FOR CONTROLLING THE SHAPE OF A COMPLEX METAL PROFILE OBTAINED BY A SERIES OF SUCCESSIVE BENDINGS OF A SHEET METAL ON A PANEL BENDER

TECHNICAL FIELD

This invention relates to a procedure for controlling the shape of a complex metal profile obtained by a series of successive bendings of a sheet metal sheet on a panel bender.

More specifically, this invention relates to a procedure by which it is possible to check the final shape of the profile in its entirety allowing a direct comparison, performed by a skilled operator, on the display of a control computer, between the real profile obtained and the nominal profile according to the design drawing.

The invention is mainly applied in the field of panel bender machines for making sheet metal profiles.

BACKGROUND ART

It is known that panel bender machines are used in the industry for the manufacture of sheet metal products which allow a succession of bends to be made on the sheet metal sheet, in such a way as to obtain a finished product such as, for example, the hood of a cooker or the shelf of a stand.

It is also known that the panel bender machines or sheet metal benders normally consist of:
- a fixed workbench for supporting the material, for example a sheet metal sheet, to be bent;
- a supporting frame for a clamping press;
- a punch or presser, forming part of the press, and a corresponding counterpunch or counterblade, being designed to clamp the material during the bending process;
- one or more auxiliary elements, inserted manually or automatically, commonly called auxiliary tools, forming part of the press, to be positioned between the punch and the corresponding counterpunch or counterblade, made specially and designed to clamp the material during the bending process of special parts;
- one or more bending blades which can move during use towards the material being processed;
- suitable mechanisms for moving the bending blade or blades along the workbench for shaping the part clamped between the punch and the counterpunch;
- suitable mechanisms for moving the punch which allow the clamping and release of the sheet metal sheet, also in the presence of auxiliary tools, guaranteeing a pressing force always corresponding to the length and thickness to be bent;
- means for feeding the sheet metal sheet, or profile, towards the blades during the work cycle;
- transducers and sensors of various types for process control, connected to an electronic control unit designed to control the production process.

A panel bender machine of the known type described above, marketed by the Applicant, comprises a C-shaped blade holder structure, which is able to move according to two directions reciprocally at right angles to the fixed workbench, on which the bending blade or blades is/are fixed.

The profile of the bend obtainable with a prior art panel bender is not only the typical 90° profile obtainable with a manual bender. The simultaneous control of the positioning of the sheet metal sheet and the pressure exerted on it makes it possible to obtained radiused profiles.

The use of conventional blades, special tools and dies, the intervention of which is likewise inserted in the bending cycle, makes it also possible to obtain special profiles, without the need for intervention of the operator with changes to the length or the special tool used.

The blades, according to the conventional construction concept, are, as stated above, supported by a C-shaped load-bearing structure mounted on the main frame and the unit comprises two blades: the upper one for making negative bends (downwards), and the lower one for positive bends (upwards).

The system controls the size of the angles and the thickness of the metal sheet, adjusting the position of the blades using proportional valves. All the movements are executed by hydraulic cylinders with proportional control. A special mechanism guarantees the parallelism of the bending unit movements.

The upper punch or presser element is sectional for obtaining the size adequate for the part to be processed and contractable so as to allow the extraction of the part processed. It is mounted on an electro-welded structure with four arms hinged in the rear part of the main frame.

Thanks to the action of suitable mechanisms each segment may be released and repositioned extremely easily, since a trigger prevents the falling from the tool holder bar.

The movements of the C-shaped structure and of the upper tool are caused by hydraulic cylinders rather than by electric motors.

The cylinders, or the electric motors, are controlled in position by a suitable system (numerical control or other system) so as to allow the highest precision during all the bending phases.

In the conventional hydraulic panel bender machines, as in other panel bender machines present on the market, there is a kinematic structure which causes and controls the movement of the blade holder unit.

This structure may in some cases be of the pentalateral type, that is, consisting of a closed kinematic chain with five members connected by five kinematic pairs.

In the hydraulic machines, the conventional kinematic chain of the pentalateral type is, however, used for providing twisting rigidity to the machine and, therefore, not with specific mechanical functions.

With patent application PCT/IT2004/000581 the same Applicant has described a particular kinematic chain with two degrees of freedom, allowing the electrical actuation of the bending blades.

The same Applicant has also introduced onto the market a series of panel bender machines characterised by the electrical actuation of the bending axes and control of the punch/presser, that is, of all the axes which deliver torques and absorb significant outputs exploiting the above-mentioned invention.

This series of machines has the following features:
- reduced energy consumption (less than half that of a corresponding hydraulic machine);
- quieter and greater environmental protection;
- better control of the pressing and bending axes with consequent improved results in terms of finish of the component;
- better performance in terms of speed and cycle times compared with that of the machines on the market.

Patent document EP-A-1410855 describes a bender machine which, using a TV camera, a display and suitable software, allows measurement of a real bending angle, comparison with a nominal bending angle, calculation of the angle of deviation between the real angle and the nominal angle, and calculation of a new real bending angle which, taking into account the deviation, makes the real bending angle coincide, as far as possible, with the nominal bending angle. More specifically, the procedure described above is performed by representing the first real angle on the display, positioning on the display a first reference indicator, calculating the angle of deviation and fixing a new bending angle which takes into account the above-mentioned angle of deviation. The above-mentioned operations are specifically performed on the display by a skilled operator who, once the image has been taken by the TV camera of the first bend made, which is shown on the display, overlaps on the display a line representing the nominal bending angle of the metal sheet, calculates the angle of deviation and enters the new bending angle in the work program in order to obtain a metal sheet bent at an angle as close as possible to the nominal bending angle.

It may be noted that the system in the above-mentioned patent application does not perform any processing of the images, and does not obtain from them any additional information, and limits itself to showing them on the display and drawing on them a line corresponding to the desired bending angle.

On the other hand, the system in the above-mentioned patent application requires the intervention of an operator who, on the basis of his/her professionalism and experience, assesses the angular differences on the display and enters in the system the most suitable angular corrections. For this reason, the system appears confused, laborious, slow and susceptible to errors in the manual procedure at the basis of its operation.

The procedure described in the above-mentioned patent document EP-A-1410855 is not suitable for performing controls, nor successive bends, for complex profiles consisting of a plurality of bends performed on a same side of the metal sheet, wherein the final profile does not comprise two segments joined together at a vertex, as illustrated in the above-mentioned document, but a generic broken line of many segments with different lengths.

The conventional method for controlling the shape of the profile uses measurement methods based on the removal of the complex profile from the machine and manual measurement of lengths and angles using a gauge and goniometer.

These methods appear to be extremely difficult, susceptible to errors, very slow and sometimes practically impossible to implement especially for measuring bending angles.

It would, on the other hand, be extremely useful to provide a tool for controlling the profile which allows the shape of the profile in its entirety to be controlled, especially when the profile in question is still located inside the panel bender machine.

DESCRIPTION OF THE INVENTION

This invention proposes to overcome the typical drawbacks and disadvantages of the prior art and to provide a procedure for controlling the shape of a complex metal profile obtained by a series of successive bendings of a sheet metal sheet on a panel bender.

This is achieved by means of a procedure having the characteristics described in claim 1.

The dependent claims describe particularly advantageous embodiments of the procedure according to this invention.

The procedure according to this invention is implemented using a TV camera which is able to acquire a digital image of the complex profile resulting from the series of bends performed on the metal sheet inside the panel bender machine and a suitable graphical analysis software which is able to convert a drawing of the complex profile to be made, with physical coordinates, prepared with a computer-aided design program computer, into a digital image.

The two digital images, one obtained by direct acquisition from the TV camera, the other by calculation and conversion from a drawing, are then superimposed on each other and visually presented on a suitable display for examination by a skilled operator.

In this way, a precise control of the shape obtained may be performed when the profile is still inside the machine and, in the case of differences, the operator may adapt the bending parameters for the next metal sheets so as to obtain a complex profile which is as close as possible to the original design.

DESCRIPTION OF THE DRAWINGS

The invention is described below with reference to the attached drawings, provided as a non-binding example, in which.

DESCRIPTION OF ONE EMBODIMENT OF THE INVENTION

Figure 1:
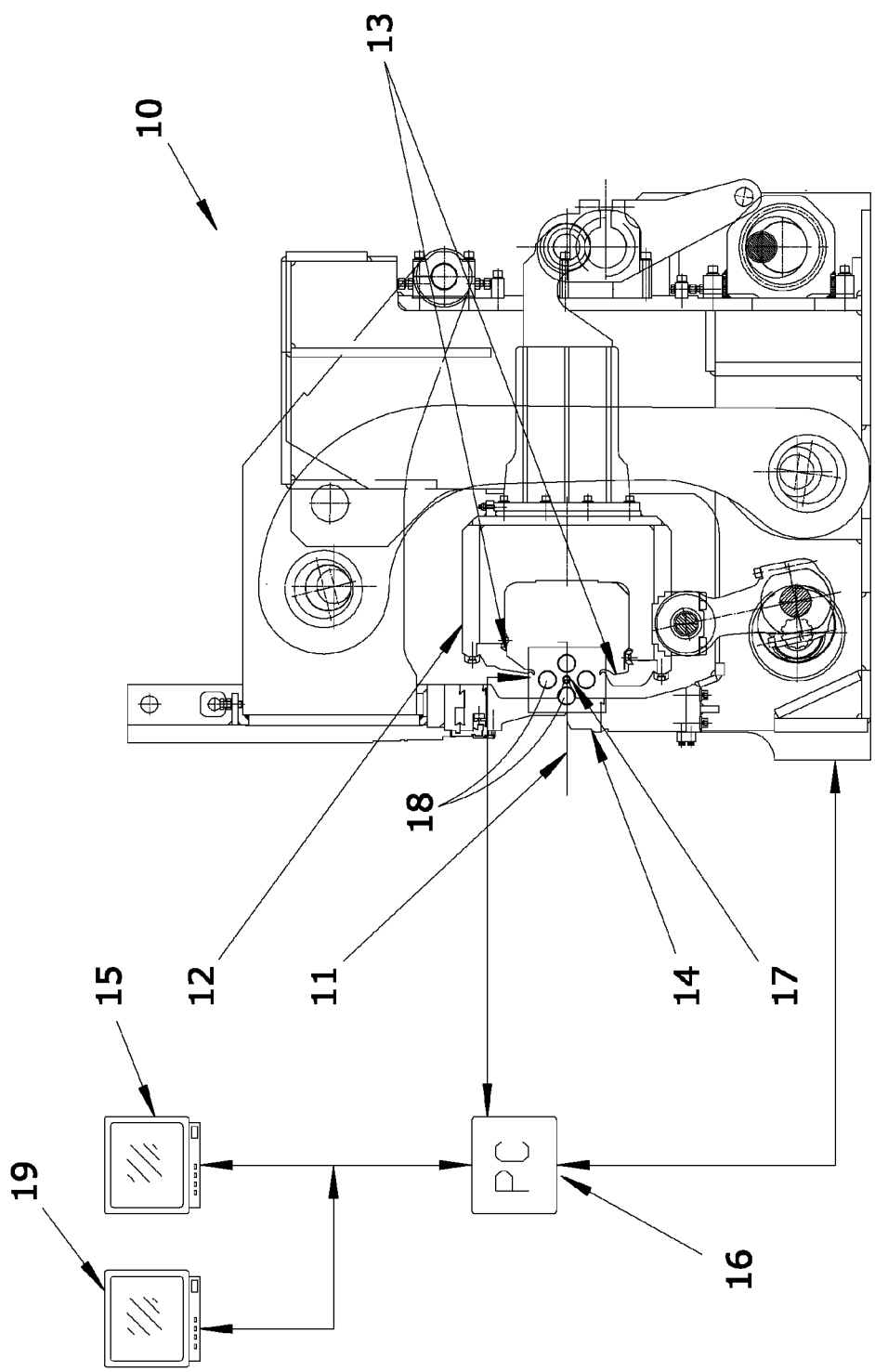
FIG. 1 shows a basic layout of the system on which this invention is based.

The figure shows a panel bender machine 10 for bending a metal sheet 11 comprising a C-shaped frame 12 on which a first series of bending blades 13 and a second series of counterblades 14 are mounted.

The operation of the panel bender machine is well known in the prior art and does not require further description. It is merely necessary to recall that a suitable machine control software (BE) controls the operation of the blades and counterblades and the movements of the frame in order to obtain one or more successive bends on the metal sheet 11 according to a predetermined arrangement and therefore obtain a metal profile having a preset shape.

In this case, a suitable screen 15, integrated in a computer 16 on which the machine control software (BE) runs, represents the bending parameters which may be entered by suitable data entry means, for example a keyboard, mouse or joystick or other data entry device.

A TV camera 17, advantageously of standard resolution (for example 640×480 pixels), is installed alongside the panel bender machine 10 with the optical vision axis aligned on the extension of the bending line and orientated towards the metal sheet being bent. The TV camera is advantageously installed at least 1 m from the closest edge of the panel bender machine. This geometrical configuration minimises the perspective effects.

Moreover, at least one illuminator 18, directed towards the metal sheet with beams of directed light (for example using a series of spot lights with parabolic reflectors) is installed close to the TV camera 17, in order to illuminate the edge of the metal sheet 11 being bent and, exploiting the reflectiveness of the latter, obtain a good contrast between the edge and the background.

Advantageously, the illuminator emits a very intense luminous beam, to allow an optimum closure of the diaphragm of the TV camera 17, and therefore obtain a large depth of field. In this way the metal sheet 11 always appears sufficiently in focus in a wide range of permissible widths.

The TV camera 17 is connected to the system control computer (for example using USB or Firewire connections) and it is controlled by this. It is able to acquire an image of a bent metal sheet 11 and make that image available to the computer for a digital graphical analysis performed using software suitable for this purpose.

The procedure according to this invention uses a dedicated software which allows the physical coordinates of the profile according to the design drawing, normally expressed in mm, to be converted into imaging coordinates which are normally expressed in pixels, and to adapt the converted image to the scale and orientation of the image produced by the TV camera.

In order to obtain this result, a calibration procedure is performed beforehand to determine the method for converting the image entered with physical coordinates into a image specified in pixels.

The calibration procedure is normally defined by five main values, comprising the scale factor (which varies according to the distance of the work surface from the TV camera) along the X axis, the scale factor along the Y axis, the angle of rotation (which takes into account that the TV camera may not be mounted perfectly) and the respective movements of the origin along the two axes.

As shown, each of these coefficients varies according to the position relative to the axis of the bender machine.

Operatively, the calibration is performed by positioning a suitable calibration pattern, consisting of a drawing formed by a series of black dots on a white background, on the counterblade, in five different equally spaced positions which cover the possible width intervals of the metal sheet.

For each position the software acquires the image, identifies the black dots and, knowing the drawing with the physical coordinates of the pattern, determines the conversion rules for the given position.

After obtaining the conversion rules for the five positions, the software calculates, for example by polynomial interpolation, the rules for each possible position along the entire interval of possible widths.

After performing the calibration procedure, it is possible to implement the procedure according to this invention, which consists in superimposing the theoretical profile (design drawing in CAD format, for example .dxf) on the real profile (from TV camera image, in pixels).

The skilled operator is provided with commands for the rotation and translation of the profile to best adapt it to that taken by the TV camera.

However, the operator does not have other degrees of freedom available, such as, for example, on the scale factors, since these are definitively fixed by the conversion rules.

Figure 2:
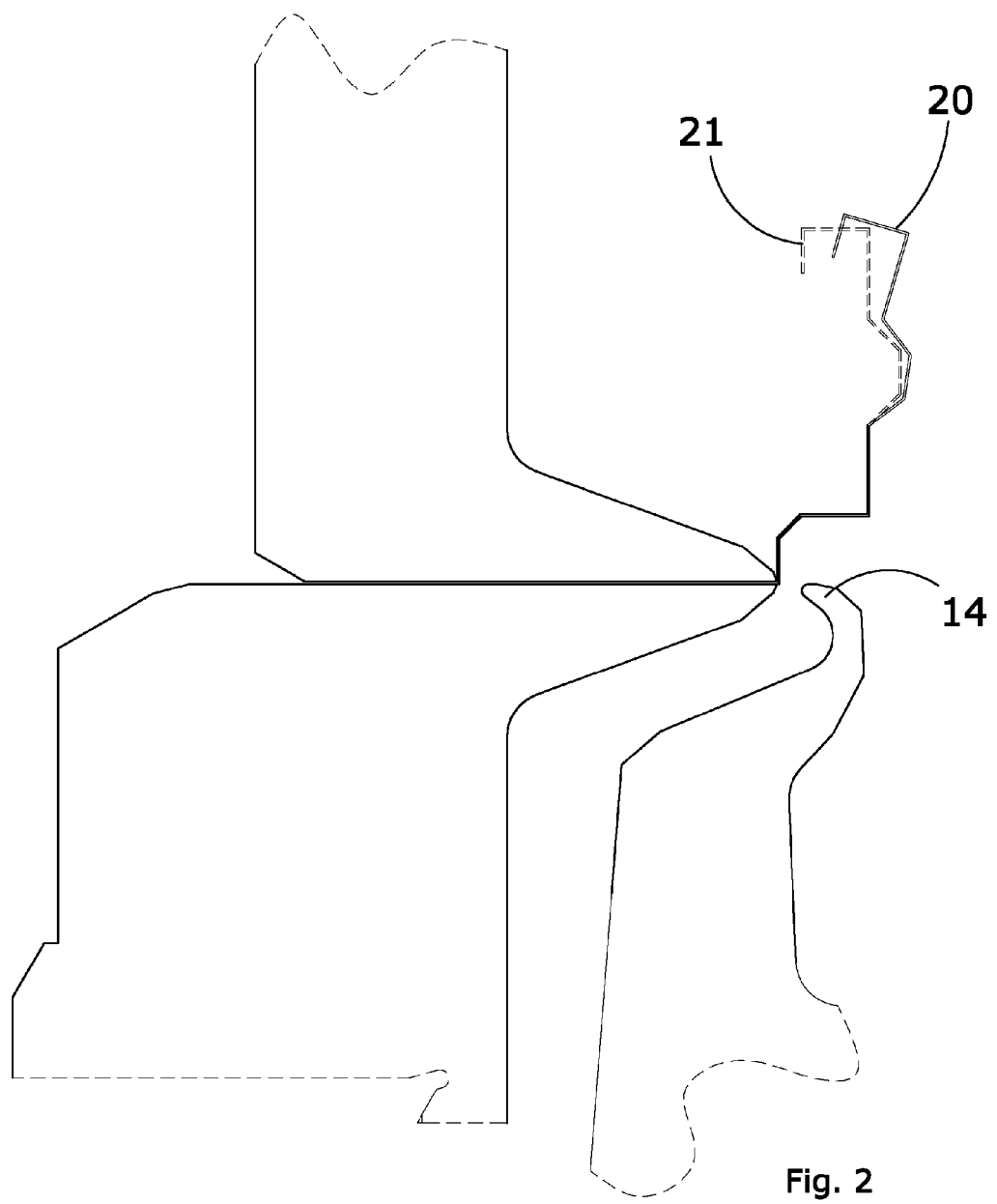
FIG. 2 shows a possible example of displaying a side view of the complex profile resulting from the bend made, with the superimposing of a drawing of the profile converted from a construction drawing.

The procedure for controlling the shape of a complex metal profile obtained by a series of successive bendings of a sheet metal sheet on a panel bender according to this invention comprises the following operations in the order shown:

a) the operator provides the system with the drawing with physical coordinates according to the design drawing (for example, a CAD drawing in .dxf format) with the profile of the metal sheet and the distance from the axis of the bender machine of the metal sheet-profile edge;

b) the system, given the position of the profile edge with respect to the axis, applies a scale factor to the nominal profile in order to correct the effects of distance, a rotation factor to ensure correct orientation and a traversing factor to reference it to the correct origin;

c) the system displays on a suitable display 19 the nominal profile processed as above and superimposed on the image of the complex profile as acquired by the TV camera. FIG. 2 shows a typical example of this step, in which a profile 20 obtained from successive bending operations in the panel bender machine differs from the construction drawing 21 converted into image format;

d) the skilled operator checks on the display that the two profile images are superimposed and, where necessary, makes rotary movements in order to improve the superimposition of the two images. Any differences in terms of lengths and angles, such as those shown between profiles 20 and 21 in FIG. 2, may be appreciated and recorded in this step in order to adapt the bending parameters of the machine for performing successive bends.

The invention is described above with reference to a preferred embodiment.

It is nevertheless clear that the invention is susceptible to numerous variations which lie within the scope of its disclosure as defined in the attached claims.

The invention claimed is:

1. A procedure for controlling the shape of a complex metal profile obtained by a plurality of successive bends of a metal sheet on a panel bender machine, wherein the panel bender machine comprises a fixed workbench for supporting the metal sheet to be bent, a supporting frame for a clamping press, a presser comprising part of the press, and a corresponding counter-presser, the fixed workbench, the supporting frame, the presser, and the counter-presser being designed to clamp the metal sheet during a bending process; the panel bender machine also comprising one or more bending blades movable towards the metal sheet during use, a series of corresponding counter-blades, mechanisms for moving the bending blade or blades, a feeding mechanism that feeds the metal sheet towards the one or more bending blades during the work cycle, transducers and sensors for process control, connected to a processor unit equipped with a first machine control software and designed to control the production process, a mechanism for entering and displaying bending data connected to the processor unit, and also comprising a TV camera installed alongside the panel bender machine whose optical vision axis is aligned with the bending line and oriented towards the metal sheet being bent, and where the TV camera can obtain a digital image of one or more bends made on the metal sheet and process this digital image using a second software for managing the TV camera fitted to the processor unit, wherein said procedure comprises the following operations in the order shown:

entry on the processor unit of data relating to a drawing of a complex profile with its physical coordinates and entry of data relating to a thickness of the metal sheet and a distance from the axis of the panel bender machine of the edge of the metal sheet;

conversion of the drawing supplied with physical coordinates into a digital image with imaging coordinates;

given the position of a profile edge with respect to the axis, application to a nominal profile of a scale factor in order to correct distance effects, application of a rotation factor to ensure correct orientation, and application of a translation factor to reference the correct origin;

display on a suitable display of a digital image of the nominal profile processed as above and superimposed on the image of the digital image of the profile as acquired by the TV camera; and following a visual inspection on the display to check that images of the nominal profile and the profile as acquired by the TV camera are superimposed to each other, where necessary, making of rotary movements in order to improve the superimposition of the two images;

wherein a calibration procedure is performed beforehand to determine the method for conversion of the image entered with physical coordinates, that is specified in metric measurements, into an image with imaging coordinates, that is, specified in pixels; and wherein the calibration procedure is defined by five main values comprising the scale factor which varies according to a distance of the work surface from the TV camera, along the X axis, the scale factor along the Y axis, an angle of rotation, and the respective movements of the origin along the two axes.

* * * * *